Aug. 28, 1928.
W. A. ZEIDLER
1,681,966
BALANCED TOGGLE VALVE
Filed Oct. 30, 1925
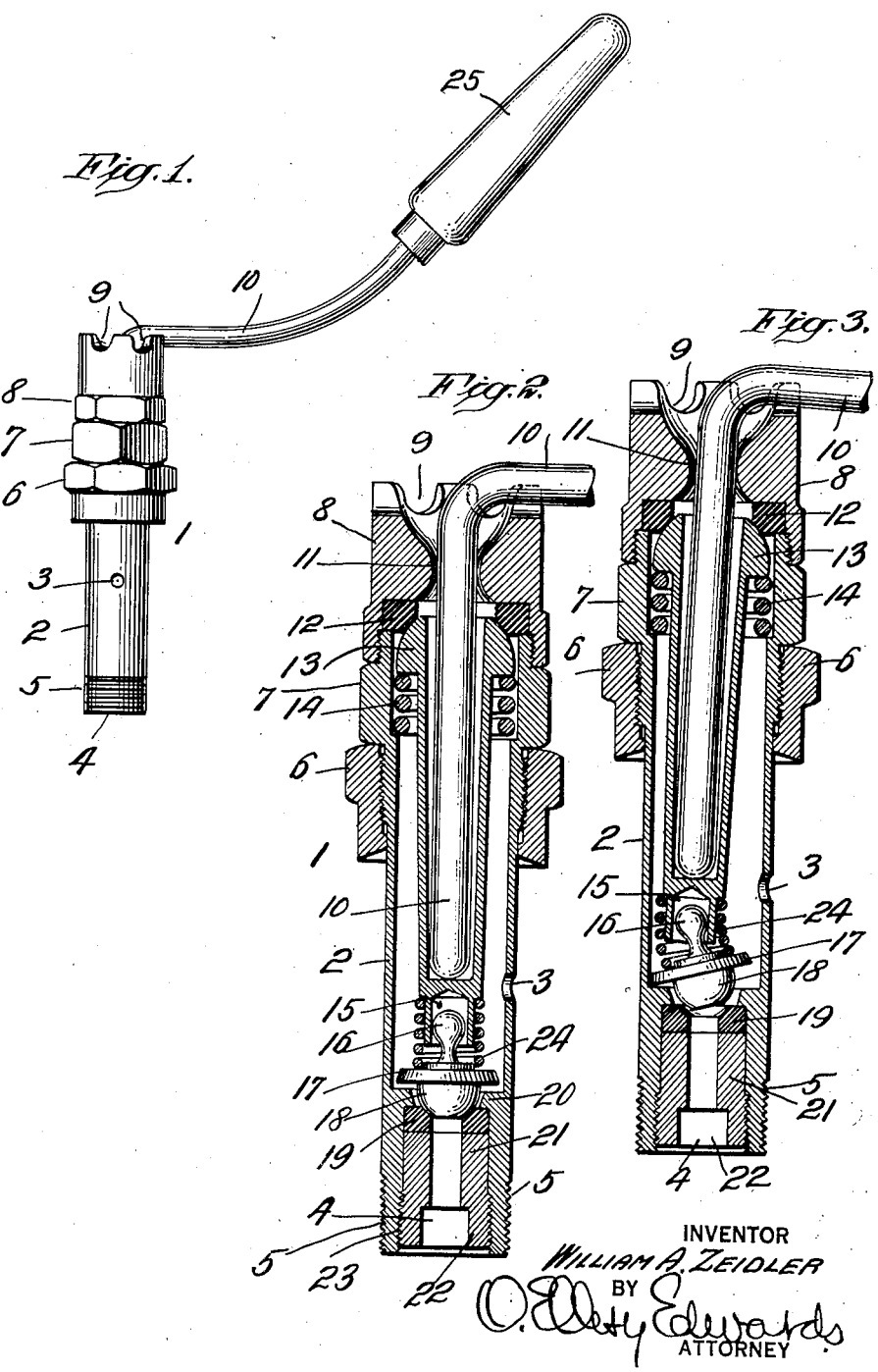
INVENTOR
WILLIAM A. ZEIDLER
BY
O. Atty Edwards
ATTORNEY Patented Aug. 28, 1928.

1,681,966

UNITED STATES PATENT OFFICE.

WILLIAM A. ZEIDLER, OF NEW YORK, N. Y.

BALANCED-TOGGLE VALVE.

Application filed October 30, 1925. Serial No. 65,829.

The object of my invention is to provide a valve which will under no circumstances leak and which may be readily opened and closed by the simple manipulation of a lever. This object is accomplished by my invention, one embodiment of which is hereinafter more particularly set forth.

For a more detailed description of my invention, reference is to be had to the accompanying drawings, forming a part hereof, in which Figure 1 is a side elevation of a valve embodying my invention.

Figures 2 and 3 are longitudinal sections of the same which reveal the operation of the various parts.

Throughout the various views of the drawings, similar reference characters designate similar parts.

My improved valve 1 has a casing 2 with an inlet opening 3 and an outlet opening 4 at the bottom. The bottom of the casing has, in the embodiment shown, screw threads 5 which may be secured to any suitable connecting means and a packing ring or boss 6 is placed near its upper end which may be secured to any suitable support, not shown. The upper end of this casing 2 is provided with a hexagonal, integral part 7 by which it may be turned and above this are screw threads which engage a flange of the boss 8. This boss 8 has a serrated upper edge 9 with a number of serrations into any one of which a bent lever 10 may pass. This lever is fulcrumed against a reduced portion 11 of the boss 8 and functions from this fulcrum in any desired position, as will appear below.

At the top of the casing or sleeve 2 is a seat of Dextine, (a phenol-formaldehyde compound) or any suitable compound 12, which is placed in between the boss and the casing, as shown in Figures 2 and 3, and it is provided with a spherical seat against which is fitted the upper end of the toggle member 13, as shown. This toggle member is kept in close contact by means of a coil spring 14 let into a suitable recess on the interior of the sleeve 2. Throughout the greater part of its length this toggle member 13 is hollow so as to receive the lever 10. The lower end of the toggle member 13 is reduced and provided with a recess 15 which surrounds a ball 16 which is integral with a disc 17 which on its lower surface carries a spherical part 18 that engages a second Dextine seat 19, which it fits, and this seat is held between an inwardly projecting collar 20 of the casing 2 and a tube 21 with the lower end of its passage made square at 22 to receive any suitable tool by which it may be turned and its exterior has screw threads 23 which engage similar screw threads on the interior of the casing 2. A coil spring 24 presses against the disc 17 and also against the shoulder at the reduced end of the toggle member 13. From the foregoing, it is apparent that the disc 17 and its connected integral parts form one toggle member and the hollow stem 13 the other and that when the lever 10 is depressed by pressing the handle 25 this lever engages the fulcrum 11 which completely surrounds it and then swings, as indicated in Figure 3, so that its lower end causes the toggle member 13 to shift out of the vertical position which it normally occupies and then the spring 24 is distorted and the lower toggle member is first shifted on the spherical part 18 until the edge of the disc 17 engages the upper surface of the shoulder 20 and then a slight further movement causes the part 18 to be bodily lifted off its seat 19 and thereby opens a passage from the inlet 3 to the outlet 4. As soon as the pressure is released from the handle 25 the spring 24 causes the lower toggle member to properly seat itself and thereafter the operation may be repeated indefinitely. The serrations 9 permit the lever 10 to be placed in any of a number of positions, and so may be operated from any direction, as may be most convenient to the operator.

From the foregoing, it is apparent that fluid pressure entering through the opening 3 aids in forcing the two toggle members to their respective seats 12 and 19 and as they are at opposite ends of these toggle members, the valve is a balanced one. Furthermore, a release of the pressure on the handle 25 causes the pressure in the chamber 3 to reinforce the action of the spring 24 and causes the spherical part 18 to resume its seat.

While I have shown and described one embodiment of my invention, it is obvious that it is not restricted thereto, but that it is broad enough to cover all structures that come within the scope of the annexed claims.

Having thus described my invention, what I claim is:

1. In a device of the class described, a casing with an inlet opening and an outlet opening, upper and lower seats connected to said casing, the lower seat surrounding one of said openings, and a toggle, one member of which comprises a valve for cooperating with the lower seat, the upper seat being engaged by the other toggle member and means for causing the valve to be raised from its seat when the toggle is shifted in any direction from its central position.

2. In a device of the class described, a casing having an inlet and an outlet opening, spherical seats at the upper and lower parts of said casing, one of the seats constituting a valve seat, toggle members engaging said seats and connected together, one of said toggle members comprising a valve for cooperating with said valve seat, springs for holding said toggle members in right relation to their seats and each other, said toggle members adapted to be operated to open the valve.

3. In a device of the class described, a casing having an inlet and an outlet opening, upper and lower seats, one of the seats constituting a valve seat, toggle members for engaging said seats, a spring engaging said toggle members, one of said toggle members comprising a valve for cooperating with said valve seat, a fulcrum adjacent to one of the toggle members and a lever adapted to engage said fulcrum and one of said toggle members and shift the said toggle members to open the valve.

4. In a device of the class described, a casing having an inlet and an outlet opening, seats, toggle members for engaging said seats, one of the seats surrounding one of said openings, one of said toggle members having a spherical part adapted to rest on the seat surrounding said opening and a disc adjacent to said spherical part and means in said casing for engaging said disc when the toggle members are sufficiently shifted whereby the spherical part will be lifted off its seat.

5. In a device of the class described, a casing having an inlet and an outlet opening, seats, toggle members for engaging said seats, one of the seats surrounding one of said openings, one of said toggle members having a spherical part adapted to rest on the seat surrounding said opening and a disc adjacent to said spherical part, means in said casing for engaging said disc when the toggle members are sufficiently shifted and means for shifting the toggle members whereby the spherical part will be lifted off its seat.

6. In a device of the class described, a valve casing having seats of Dextine, one of said seats constituting a valve seat, toggle members with spherical parts engaging said seats, means for causing said toggle members to articulate, springs holding said toggle members to said seats and in right relation and a disc forming a part of one of said toggle members and adapted to engage said casing when the toggle members are sufficiently shifted whereby the spherical part is raised from its seat.

7. In a device of the class described, a valve body, an inlet opening and an outlet opening, a valve seat fixed between said openings, a shoulder above said valve seat, a seat at the top of said casing and a boss for holding the same in place, said boss being provided with a fulcrum, toggle members having parts engaging said seats and articulated together, one of said parts constituting a valve, a spring holding said toggle members in proper relation at all times, a spring holding one toggle member against the upper seat, said last mentioned toggle member adapted to receive a lever therein and a lever adapted to engage said last mentioned toggle member and said fulcrum and shift both toggle members, said shoulder adapted to be engaged by one toggle member when the toggle members have been sufficiently shifted by the lever whereby said valve is raise from its seat.

8. In a valve, the combination of a casing having an inlet and an exhaust part; a valve seat for the exhaust part, a valve nominally resting thereon and closing the same, means urging said valve to its seat, an arm mounted within the casing and engaging the valve in a manner to allow of a lateral rocking motion between the arm and valve, and means for tilting the arm and thereby moving the valve from its seat.

In testimony whereof, I have hereunto set my hand and seal this 24 day of October, 1925.

WILLIAM A. ZEIDLER.